US009245474B2

(12) United States Patent
Tsai et al.

(10) Patent No.: US 9,245,474 B2
(45) Date of Patent: Jan. 26, 2016

(54) DISPLAY DRIVING DEVICE AND METHOD FOR DRIVING DISPLAY

(71) Applicant: Novatek Microelectronics Corp., Hsinchu (TW)

(72) Inventors: Wen-Pin Tsai, Hsinchu (TW); Jen-Chung Chang, Hsinchu (TW)

(73) Assignee: Novatek Microelectronics Corp, Hsinchu (TW)

( * ) Notice: Subject to any disclaimer, the term of this patent is extended or adjusted under 35 U.S.C. 154(b) by 153 days.

(21) Appl. No.: 14/135,592

(22) Filed: Dec. 20, 2013

(65) Prior Publication Data

US 2015/0123963 A1 May 7, 2015

(30) Foreign Application Priority Data

Nov. 1, 2013 (TW) ............................ 102139741 A

(51) Int. Cl.

*G06F 3/038* (2013.01)
*G09G 3/20* (2006.01)
*G09G 5/00* (2006.01)

(52) U.S. Cl.

CPC .............. *G09G 3/2096* (2013.01); *G09G 5/008* (2013.01); *G09G 2310/08* (2013.01); *G09G 2340/0435* (2013.01); *G09G 2360/12* (2013.01)

(58) Field of Classification Search

CPC ......... G06F 3/038; G06F 15/00; G06F 13/14; G09G 5/00; G06T 1/00; H04N 5/228; H04N 5/04; H04N 9/44; H04N 5/235; H03L 7/00
USPC .......................... 345/204, 211, 213, 501, 519
See application file for complete search history.

(56) References Cited

U.S. PATENT DOCUMENTS

| | | | | |
|---|---|---|---|---|
| 6,577,322 | B1 * | 6/2003 | Fukuda | 345/698 |
| 7,046,057 | B1 * | 5/2006 | Culler | 327/156 |
| 7,671,897 | B2 * | 3/2010 | Tsai | 348/222.1 |
| 2008/0309818 | A1 * | 12/2008 | Weng et al. | 348/537 |

(Continued)

FOREIGN PATENT DOCUMENTS

| | | |
|---|---|---|
| TW | 200539105 | 12/2005 |
| TW | 200615892 | 5/2006 |
| TW | 200840347 | 10/2008 |
| TW | 200849972 | 12/2008 |

(Continued)

OTHER PUBLICATIONS

"Office Action of Taiwan Counterpart Application" , issued on Apr. 17, 2015, p. 1-p. 16.

*Primary Examiner* — Pegeman Karimi
(74) *Attorney, Agent, or Firm* — Jianq Chyun IP Office

(57) ABSTRACT

A display driving device and a method for driving a display are provided. The display driving device includes a host and a driving chip. The host transmits an image data and a synchronization signal. The driving chip receives the image data and the synchronization signal and drives a display panel to display frames. The driving chip includes a storage unit, a driving module, and a control circuit. The storage unit stores the image data. The driving module drives the display panel to display the frames according to the image data from the host and a timing generator frequency of the driving module. The control circuit detects a target frequency of the synchronization signal and the timing generator frequency of the driving module, compares the target frequency and the timing generator frequency, outputs an adjustment value according to the comparison result, and adjusts the timing generator frequency of driving module.

20 Claims, 7 Drawing Sheets

(56) References Cited

U.S. PATENT DOCUMENTS

| | | | | |
|---|---|---|---|---|
| 2011/0109597 | A1* | 5/2011 | Kim | 345/204 |
| 2011/0273462 | A1* | 11/2011 | Yang et al. | 345/536 |
| 2013/0201124 | A1 | 8/2013 | Choi et al. | |

FOREIGN PATENT DOCUMENTS

| | | |
|---|---|---|
| TW | 201118831 | 6/2011 |
| TW | 201243821 | 11/2012 |
| TW | 201327540 | 7/2013 |

* cited by examiner

DISPLAY DRIVING DEVICE AND METHOD FOR DRIVING DISPLAY

CROSS-REFERENCE TO RELATED APPLICATION

This application claims the priority benefit of Taiwan application serial no. 102139741, filed on Nov. 1, 2013. The entirety of the above-mentioned patent application is hereby incorporated by reference herein and made a part of this specification.

BACKGROUND OF THE INVENTION

1. Field of Invention

The invention relates generally to a display driving device and a method for driving a display, and more particularly to a display driving device capable of dynamically adjusting a timing generator frequency and a method for driving a display thereof.

2. Description of Related Art

When the conventional liquid crystal display (LCD) driver outputs image frames, typically its internal circuits require an oscillator with a fixed timing to serve as a reference frequency. For example, a refresh frequency of 60 Hz per second may be used to sequentially output display data. In practice, however, the oscillator in the internal circuit of the driver may have variations in its oscillating frequency due to external factors such as temperature, voltage, or manufacturing processes.

Since each display frame needs to be refreshed in the dynamic mode, the host sequentially refreshes the display frame line by line every 1/60 second through the transmission interface. Assuming the transmission interface has already transmitted data of a first display line and begins to transmit the data for a second display line, display issues may occur for the driver due to external factors of temperature or voltage, for example, which causes the internal oscillator frequency of the driver to become slower, resulting in the driver failing to completely output the display data of the first display line onto the display panel.

SUMMARY OF THE INVENTION

The invention provides a display driving device and a method for driving a display.

The invention provides a display driving device, including a host and a driving chip. The host transmits an image data and a synchronization signal. The driving chip receives the image data and the synchronization signal and drives a display panel to display a plurality of image frames. The driving chip includes a storage unit, a driving module, and a control circuit. The storage unit stores the image data. The driving module is coupled to the storage unit, and the driving module drives the display panel to display the image frames according to the image data from the host and a timing generator frequency of the driving module. The control circuit is coupled to the host, the driving module, and the storage unit, and the control circuit detects a target frequency of the synchronization signal and the timing generator frequency of the driving module, compares the target frequency and the timing generator frequency, outputs an adjustment value according to the comparison result, and adjusts the timing generator frequency of driving module according to the adjustment value.

According to an embodiment of the invention, when the timing generator frequency and the target frequency are substantially the same, the control circuit maintains the timing generator frequency.

According to an embodiment of the invention, the control circuit adjusts the timing generator frequency of the driving module at least one image frame after the comparison result has been obtained.

According to an embodiment of the invention, the synchronization signal includes a vertical synchronization signal and a horizontal synchronization signal.

According to an embodiment of the invention, the synchronization signal includes a periodic protocol command.

According to an embodiment of the invention, the periodic protocol command is defined by the Mobile Industry Processor Interface (MIPI).

According to an embodiment of the invention, the host further transmits an external clock signal to the driving chip, and the control circuit adjusts the timing generator frequency according to a clock frequency of the external clock signal.

According to an embodiment of the invention, the host transmits the image data and the synchronization signal by a continuous clock mode.

According to an embodiment of the invention, the host transmits the image data and the synchronization signal by a non-continuous clock mode.

According to an embodiment of the invention, the driving module further includes a timing generator and a driving unit. The timing generator is coupled to the control circuit and the storage unit, and the timing generator generates a drive clock signal according to the image data, in which the timing generator frequency is determined by the drive clock signal. The driving unit is coupled to the timing generator and the display panel, and the driving unit drives the display panel to display the image frames according to the image data and the timing generator frequency.

The invention provides a method for driving a display, including the following steps: providing, by a host, an image data and a synchronization signal; transmitting a sleep-out command to a driving module; detecting a target frequency of the synchronization signal and a timing generator frequency of the driving module; comparing the target frequency and the timing generator frequency; outputting an adjustment value according to the comparison result and adjusting the timing generator frequency of the driving module according to the adjustment value; and driving a display panel of the display to display a plurality of image frames according to the image data of the host and the timing generator frequency of the driving module.

According to an embodiment of the invention, when the timing generator frequency and the target frequency are substantially the same, the control circuit maintains the timing generator frequency.

According to an embodiment of the invention, the method for driving the display further includes transmitting, by the host, an external clock signal to the driving module; and adjusting the timing generator frequency according to a clock frequency of the external clock signal.

In summary, according to embodiments of the invention, the display driving device and method for driving display adopt dynamic adjustment mechanisms and frameworks by detecting and comparing the internal timing generator frequency and the target frequency, thereby achieving an automatic correction effect for the timing generator frequency. The adjustment mechanisms in the embodiments of the invention are diverse, since the control circuit may adjust the internal timing generator frequency according to the external clock frequency directly provided by the host, or the adjustment may be determined according to the synchronization signal transmitted by the host. Therefore, the display driving device and method for driving display may ensure the accuracy of the displayed frames.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
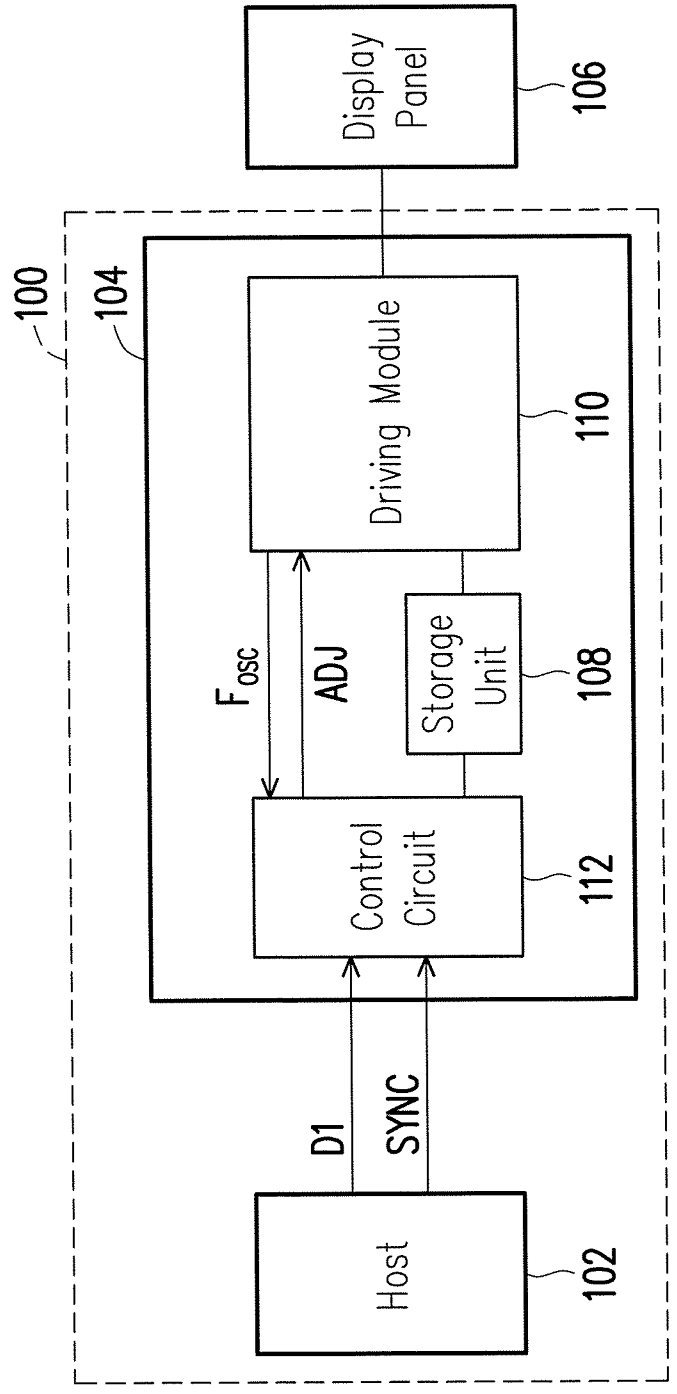
FIG. 1 is a schematic view of a display driving device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of a display driving device according to an embodiment of the invention. Referring to FIG. 1, a display panel driving device 100 includes a host 102 and a driving chip 104. The host 102 provides an image data D1 and a synchronization signal SYNC, and the driving chip 104 receives the image data D1 and the synchronization signal SYNC and drives a display panel 106 to display a plurality of image frames. As shown in FIG. 1, the driving chip 104 includes a storage unit 108, a driving module 110 coupled to the storage unit 108, and a control circuit 112 coupled to the host 102, the storage unit 108, and the driving module 110. The storage unit 108 may be used to store the image data D1 and the synchronization signal SYNC provided by the host 102, for example. The driving module 110 may be used to drive the display panel 106 to display the image frames according to the image data D1 of the host 102 and a timing generator frequency $F_{OSC}$ of the driving module 110.

In the present embodiment, the control circuit may detect a target frequency of the synchronization signal SYNC and the timing generator frequency $F_{OSC}$ of the driving module 110. In addition, the control circuit 112 may compare the target frequency and the timing generator frequency $F_{OSC}$. According to the comparison result, the control circuit 112 outputs a correction value ADJ and adjusts the timing generator frequency $F_{OSC}$ of the driving module 110 according to the correction value ADJ.

Figure 2:
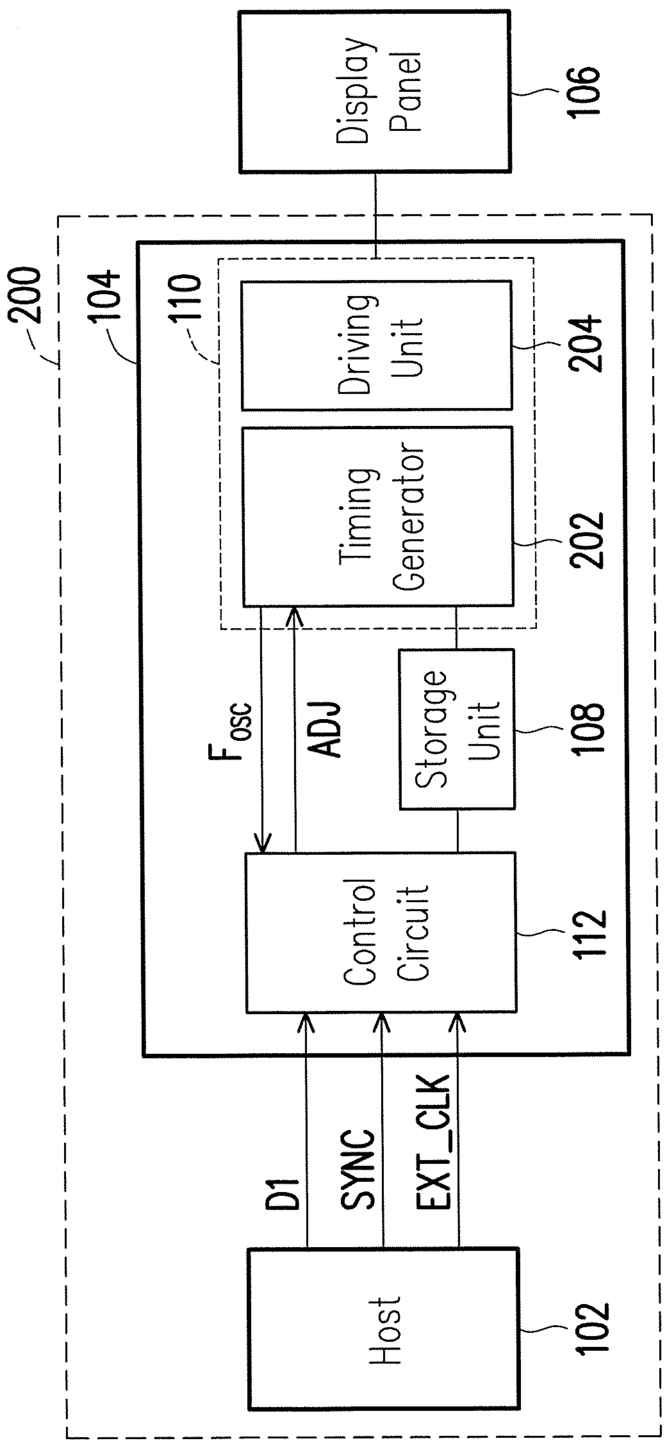
FIG. 2 is a schematic view of a display panel driving device according to another embodiment of the invention.

FIG. 2 is a schematic view of a display panel driving device according to another embodiment of the invention. With reference to FIG. 2, a difference between a display panel driving device 200 of the present embodiment and the display panel driving device 100 is that, the driving module 110 in the display panel driving device 100 may further include a timing generator 202 coupled to the control circuit 112 and the storage unit 108, and a driving unit 204 coupled to the timing generator 202 and the display panel 106. In the present embodiment, the timing generator 202 may generate a drive clock signal according to the image data D1, in which the timing generator frequency $F_{OSC}$ may be determined by the drive clock signal. Moreover, the driving unit 204 may drive the display panel 106 to display image frames according to the image data D1 and the timing generator frequency $F_{OSC}$.

Figure 3:
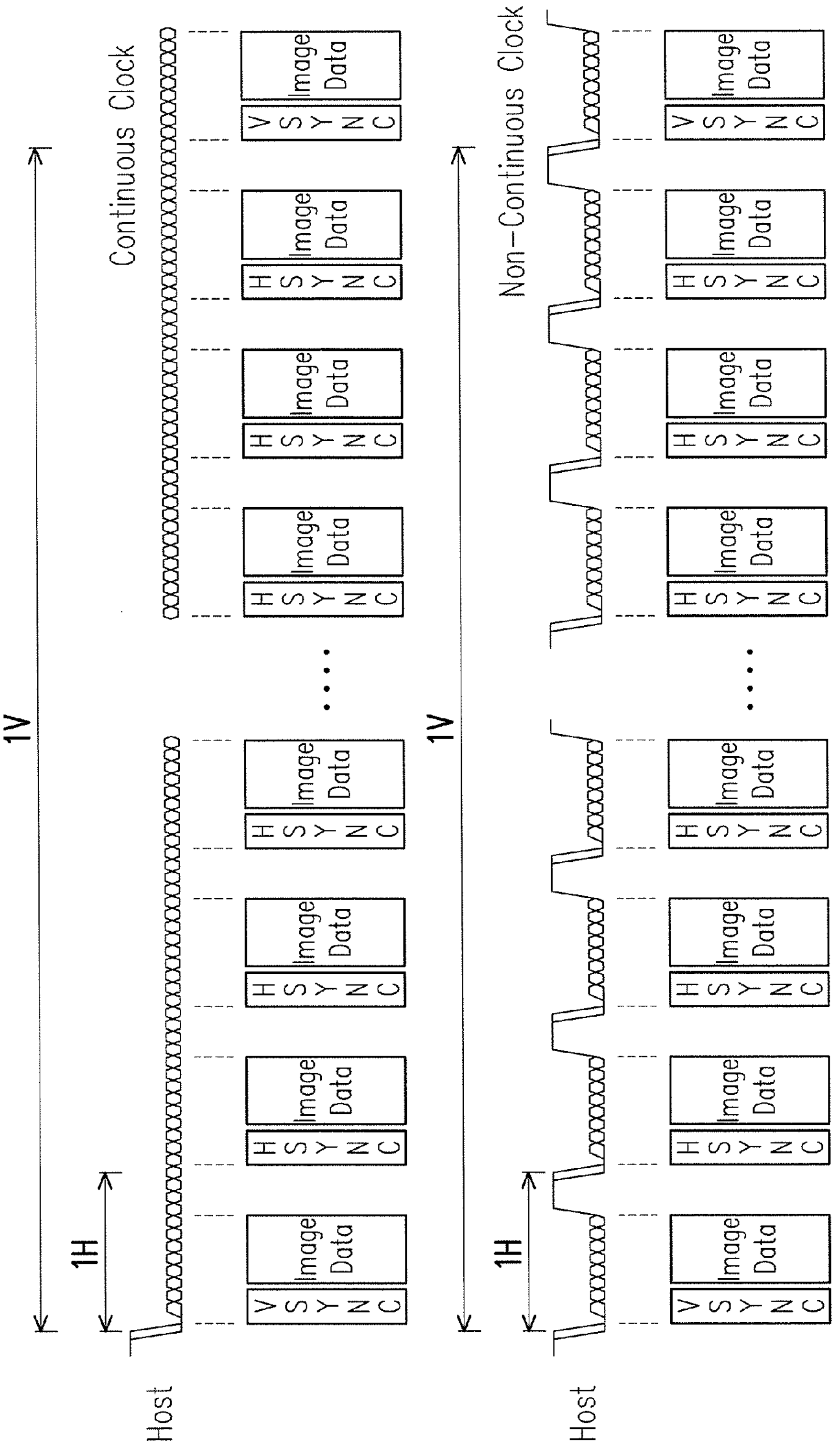
FIG. 3 is a schematic view of the clock modes for a host transmitting data to a display panel driving device according to an embodiment of the invention.

With reference to FIGS. 2 and 3, in some embodiments of the invention, the synchronization signal SYNC may include a vertical synchronization signal VSYNC and a horizontal synchronization signal HSYNC. In addition, the synchronization signal SYNC may further include periodic protocol commands, such as periodic protocol commands defined by the Mobile Industry Processor Interface (MIPI). It should be noted that, in some embodiments of the invention, the control circuit 112 may automatically detect and adjust the internal timing generator frequency $F_{OSC}$ of the driving module 110 according to the different types of synchronization signal SYNC transmitted by the host 102.

In other embodiments of the invention, the host 102 may also directly transmit an external clock signal EXT_CLK to the driving chip 104. The control circuit 102 may adjust the timing generator frequency $F_{OSC}$ according to a clock frequency of the external clock signal EXT_CLK. The clock frequency of the external clock signal EXT_CLK may be a constant clock frequency, for example. Moreover, the host 102 may also adjust the external clock signal EXT_CLK transmitted to the driving chip 104 according to environmental factors such as voltage, temperature, manufacturing processes, electrostatic discharge (ESD) or a specific requirement. Furthermore, in some embodiments of the invention, the host 102 may transmit the image data D1, the synchronization signal SYNC, and/or the external clock signal EXT_CLK to the driving chip 104 through a MIPI bus, although the invention is not limited thereto. In other embodiments of the invention, the host 102 may also transmit other data suitable for dynamically adjusting the timing generator frequency $F_{OSC}$ in the driving chip 104 via other types of transmission channels.

In specifics, FIG. 3 is a schematic view of the clock modes for a host transmitting data to a display panel driving device according to an embodiment of the invention. With reference to FIG. 3, the host 102 may transmit the image data D1 and the synchronization signal SYNC (or other signals such as the external clock signal EXT_CLK) by a continuous clock mode. Moreover, the host 102 may also transmit the image data D1 and the synchronization signal SYNC (or other signals such as the external clock signal EXT_CLK) by a non-continuous clock mode, although the invention is not limited thereto. In other embodiments of the invention, the clock mode may be adjusted according to an actual requirement from a mobile phone manufacturer. For example, different types of hosts (e.g. baseband processors or application processors) may utilize a hybrid continuous and non-continuous clock mode to transmit data.

Figure 4:
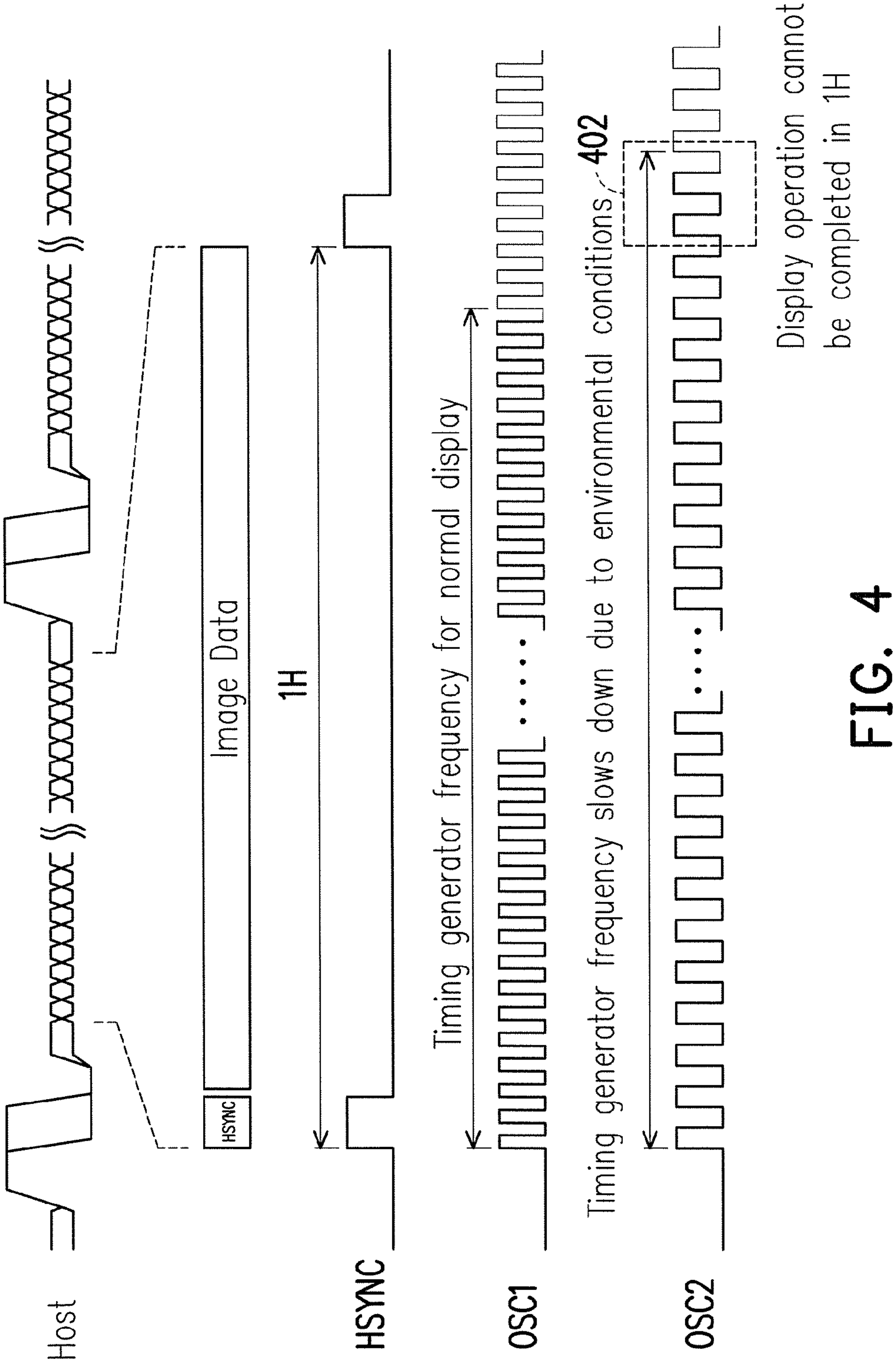
FIG. 4 are schematic clock diagrams when environmental conditions change and a timing generator frequency needs to be adjusted according to an embodiment of the invention.

FIG. 4 are schematic clock diagrams when environmental conditions change and a timing generator frequency needs to be adjusted according to an embodiment of the invention. With reference to FIG. 4, OSC1 represents a timing generator clock under normal display. Under high or low temperature, or when the power supply and other environmental conditions change, the timing generator (e.g. an oscillator) may become slower. As shown by a time segment 402 depicted in FIG. 4, when the frequency of the timing generator is slowed so as to exceed a time period of a display line (e.g., a timing generator clock OSC2 under abnormal display), the driving operation of the display line may not have time to be completed (e.g., when exceeding a horizontal synchronization period 1H), and thus resulting in the abnormal display of image frames.

Figure 5:
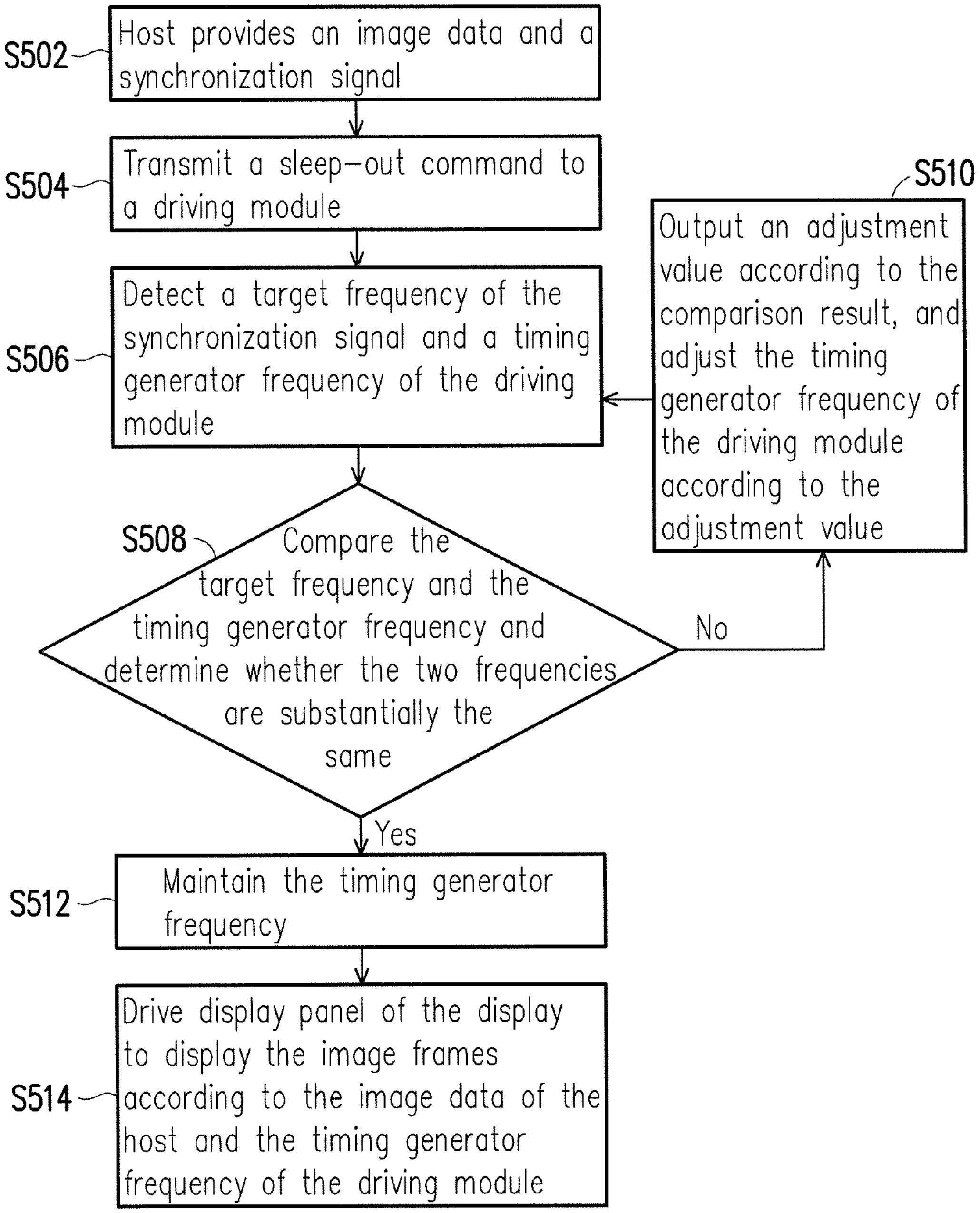
FIG. 5 is a flow diagram of a method for driving a display panel according to an embodiment of the invention.

FIG. 5 is a flow diagram of a method for driving a display panel according to an embodiment of the invention. With reference to FIG. 5, in view of the foregoing description, a method for driving a display panel may include the following steps. A host provides an image data and a synchronization signal (Step S502). Thereafter, a sleep-out command is transmitted to a driving module (Step S504). Moreover, the method for driving the display panel further include detecting a target frequency of the synchronization signal and a timing generator frequency of the driving module (Step S506), comparing the target frequency and the timing generator frequency, and determining whether the two frequencies are substantially the same (Step S508). When the timing generator frequency and the target frequency are substantially different, an adjustment value is outputted according to the comparison result, and the timing generator frequency of the driving module is adjusted according to the adjustment value (Step S510). On the other hand, when the timing generator frequency and the target frequency are substantially the same, the timing generator frequency is maintained (Step S512). The display panel of the display is then driven to display the image frames according to the image data of the host and the timing generator frequency of the driving module (Step S514).

In specifics, in another embodiment of the invention, the timing generator frequency of the driving module may be adjusted at least one image frame after the comparison result has been obtained. Moreover, in other embodiments, the method for driving the display panel may include the host transmitting an external clock signal to the driving chip, and adjusting the timing generator frequency according to a clock frequency of the external clock signal.

Figure 6A:
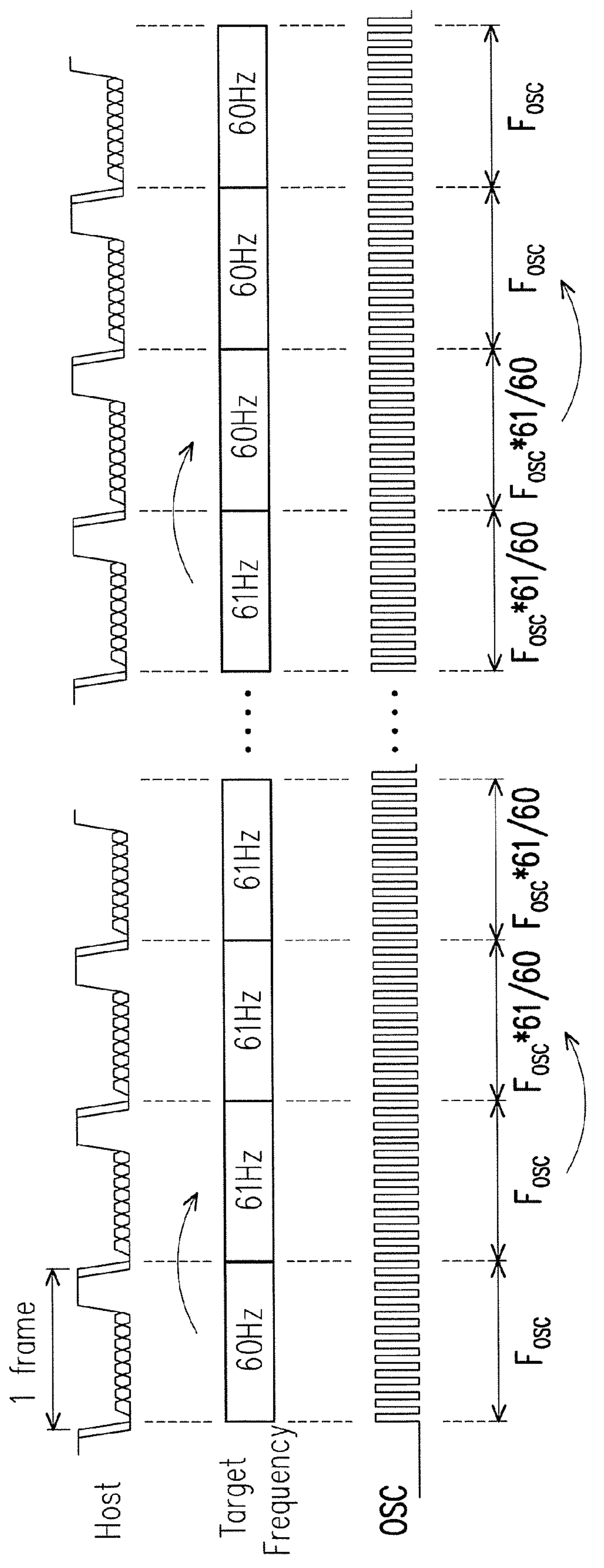
FIGS. 6A-6C are timing diagrams depicting adjustments of a timing generator frequency of a driving module according to an embodiment of the invention.
Figure 6B:
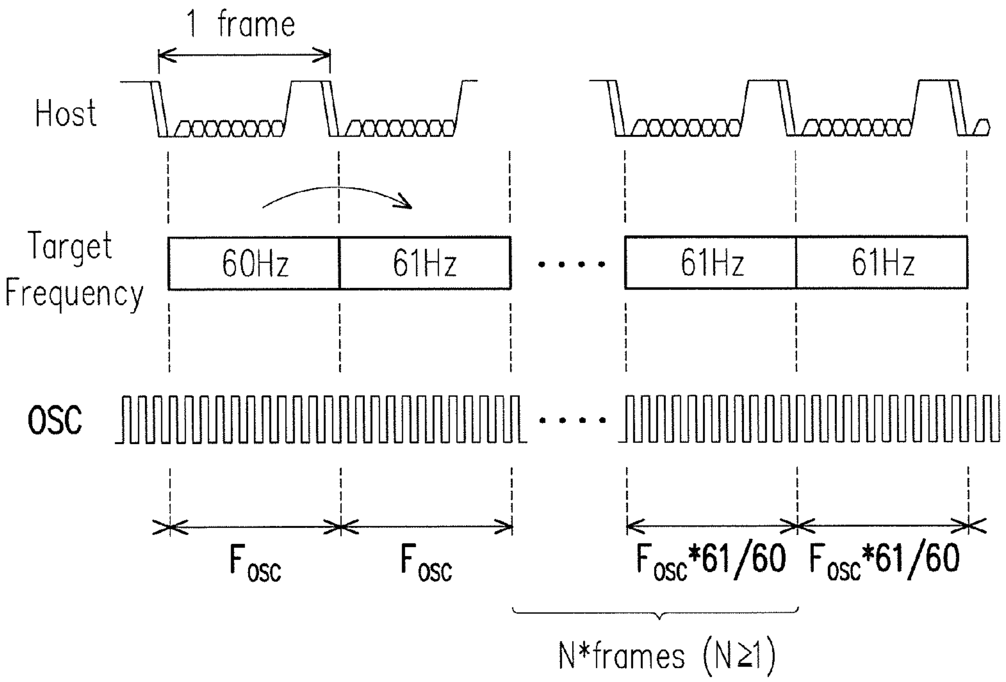
Figure 6C:
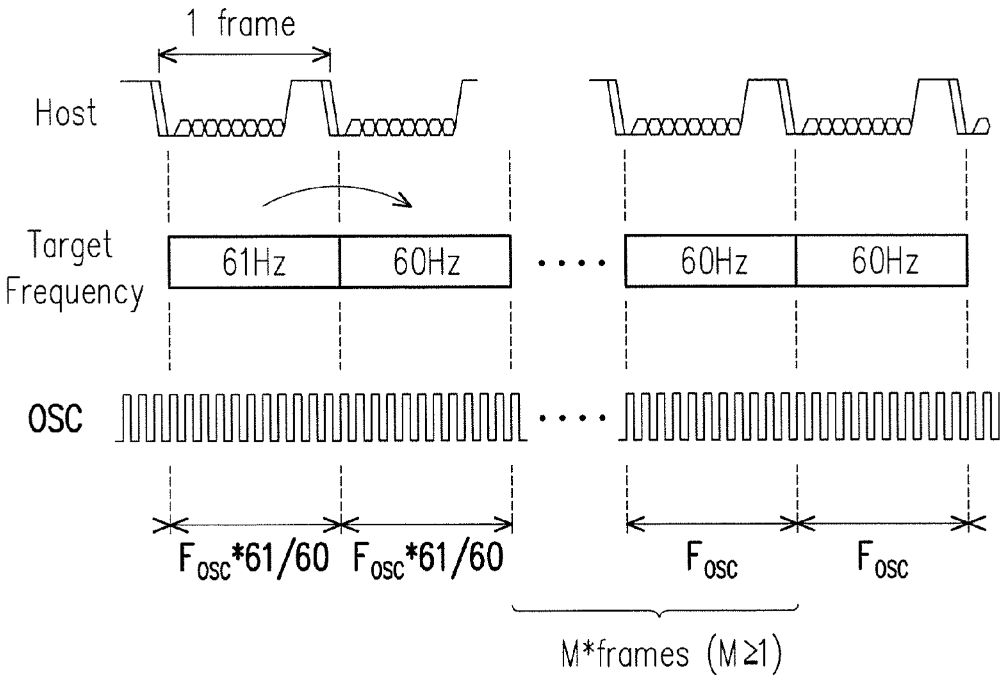

FIGS. 6A-6C are timing diagrams depicting adjustments of a timing generator frequency of a driving module according to an embodiment of the invention. With reference to FIG. 6A, as shown on the left side, the target frequency of the synchronization signal SYNC detected by the control circuit 112 increases (e.g., from 60 Hz to 61 Hz), and the control circuit 112 accordingly adjusts the timing generator frequency $F_{OSC}$ of the driving module 110 with an adjustment value ADJ of 61/60, for example. Moreover, as shown on the right side of FIG. 6A, the target frequency of the synchronization signal SYNC detected by the control circuit 112 decreases (e.g., from 61 Hz to 60 Hz), and the control circuit 112 accordingly adjusts the timing generator frequency $F_{OSC}$ of the driving module 110 with an adjustment value ADJ of 60/61, for example. In specifics, FIGS. 6B-6C illustrate that the control circuit 112 may adjust the timing generator frequency $F_{OSC}$ of the driving module 110 at least one image frame after the comparison result has been obtained. As shown in FIG. 6B, when the target frequency increases, the control circuit 112 may adjust the timing generator frequency $F_{OSC}$ of the driving module 110 to $F_{OSC}$*61/60 at least one image frame (N≥1 image frames) after comparing the target frequency and the timing generator frequency $F_{OSC}$. Moreover, as shown in FIG. 6C, when the target frequency decreases, the control circuit 112 may adjust the timing generator frequency $F_{OSC}$*61/60 of the driving module 110 to $F_{OSC}$ at least one image frame (M≥1 image frames) after the comparison result has been obtained.

In view of the foregoing, according to embodiments of the invention, the display driving device and method for driving display adopt dynamic adjustment mechanisms and frameworks by detecting and comparing the internal timing generator frequency and the target frequency, thereby achieving an automatic correction effect for the timing generator frequency. The adjustment mechanisms in the embodiments of the invention are diverse, since the control circuit may adjust the internal timing generator frequency according to the external clock frequency directly provided by the host, or the adjustment may be determined according to the synchronization signal transmitted by the host. Therefore, the display driving device and method for driving display may ensure the accuracy of the displayed frames.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display driving device, comprising:
a host transmitting an image data and a synchronization signal; and
a driving chip receiving the image data and the synchronization signal and driving a display panel to display a plurality of image frames, the driving chip comprising:
a storage unit storing the image data;
a driving module coupled to the storage unit, the driving module driving the display panel to display the image frames according to the image data from the host and a timing generator frequency of the driving module; and
a control circuit coupled to the host, the driving module, and the storage unit, the control circuit detecting a target frequency of the synchronization signal and the timing generator frequency of the driving module, comparing the target frequency and the timing generator frequency, outputting an adjustment value according to the comparison result, and adjusting the timing generator frequency of driving module according to the adjustment value.

2. The display driving device according to claim 1, wherein when the timing generator frequency and the target frequency are substantially the same, the control circuit maintains the timing generator frequency.

3. The display driving device according to claim 1, wherein the control circuit adjusts the timing generator frequency of the driving module at least one image frame after the comparison result has been obtained.

4. The display driving device according to claim 1, wherein the synchronization signal comprises a vertical synchronization signal and a horizontal synchronization signal.

5. The display driving device according to claim 1, wherein the synchronization signal comprises a periodic protocol command.

6. The display driving device according to claim 5, wherein the periodic protocol command is defined by the Mobile Industry Processor Interface (MIPI).

7. The display driving device according to claim 1, wherein the host further transmits an external clock signal to the driving chip, and the control circuit adjusts the timing generator frequency according to a clock frequency of the external clock signal.

8. The display driving device according to claim 1, wherein the host transmits the image data and the synchronization signal by a continuous clock mode.

9. The display driving device according to claim 1, wherein the host transmits the image data and the synchronization signal by a non-continuous clock mode.

10. The display driving device according to claim 1, wherein the driving module comprises:

a timing generator coupled to the control circuit and the storage unit, the timing generator generating a drive clock signal according to the image data, wherein the timing generator frequency is determined by the drive clock signal; and a driving unit coupled to the timing generator and the display panel, the driving unit driving the display panel to display the image frames according to the image data and the timing generator frequency.

11. A method for driving a display, comprising:

providing, by a host, an image data and a synchronization signal;

transmitting a sleep-out command to a driving module;

detecting a target frequency of the synchronization signal and a timing generator frequency of the driving module;

comparing the target frequency and the timing generator frequency;

outputting an adjustment value according to the comparison result and adjusting the timing generator frequency of the driving module according to the adjustment value; and driving a display panel of the display to display a plurality of image frames according to the image data of the host and the timing generator frequency of the driving module.

12. The method for driving the display according to claim 11, wherein when the timing generator frequency and the target frequency are substantially the same, the method further comprises maintaining the timing generator frequency.

13. The method for driving the display according to claim 11, wherein the timing generator frequency of the driving module is adjusted at least one image frame after the comparison result has been obtained.

14. The method for driving the display according to claim 11, wherein the synchronization signal comprises a vertical synchronization signal and a horizontal synchronization signal.

15. The method for driving the display according to claim 11, wherein the synchronization signal comprises a periodic protocol command.

16. The method for driving the display according to claim 15, wherein the periodic protocol command is defined by the Mobile Industry Processor Interface (MIPI).

17. The method for driving the display according to claim 11, further comprising:

transmitting, by the host, an external clock signal to the driving module; and adjusting the timing generator frequency according to a clock frequency of the external clock signal.

18. The method for driving the display according to claim 11, wherein the host transmits the image data and the synchronization signal by a continuous clock mode.

19. The method for driving the display according to claim 11, wherein the host transmits the image data and the synchronization signal by a non-continuous clock mode.

20. The method for driving the display according to claim 11, wherein the driving module comprises:

a timing generator coupled to a control circuit and a storage unit, the timing generator generating a drive clock signal, wherein the timing generator frequency is determined by the drive clock signal; and a driving unit coupled to the timing generator and the display panel, the driving unit driving the display panel to display the image frames according to the image data and the timing generator frequency.

* * * * *